United States Patent
Kimoto et al.

(10) Patent No.: US 12,025,544 B2
(45) Date of Patent: Jul. 2, 2024

(54) DROPLET PARTICLE, AND METHOD AND DEVICE FOR PRODUCING DROPLET PARTICLE

(71) Applicants: Kimoto Electric Co., Ltd., Osaka (JP); Osaka University, Osaka (JP)

(72) Inventors: Takashi Kimoto, Osaka (JP); Michisato Toyoda, Osaka (JP); Hiroshi Nakayama, Osaka (JP)

(73) Assignees: Osaka University, Osaka (JP); Kimoto Electric Co., Ltd., Osaka (JP)

( * ) Notice: Subject to any disclaimer, the term of this patent is extended or adjusted under 35 U.S.C. 154(b) by 1097 days.

(21) Appl. No.: 16/096,096

(22) PCT Filed: Aug. 9, 2018

(86) PCT No.: PCT/JP2018/029989
§ 371 (c)(1),
(2) Date: Oct. 24, 2018

(87) PCT Pub. No.: WO2019/155662
PCT Pub. Date: Aug. 15, 2019

(65) Prior Publication Data
US 2021/0223147 A1    Jul. 22, 2021

(30) Foreign Application Priority Data
Feb. 7, 2018    (JP) .................... 2018-020497

(51) Int. Cl.
*G01N 1/40*    (2006.01)
*G01N 1/00*    (2006.01)
*H01J 49/04*    (2006.01)

(52) U.S. Cl.
CPC ............ *G01N 1/40* (2013.01); *H01J 49/0436* (2013.01); *G01N 2001/002* (2013.01)

(58) Field of Classification Search
CPC .. G01N 1/40; G01N 2001/002; H01J 49/0436
See application file for complete search history.

(56) References Cited

U.S. PATENT DOCUMENTS

| 2002/0001544 A1 | 1/2002 | Hess et al. |
| 2011/0111232 A1* | 5/2011 | Chaumonnot .......... C01B 39/00 428/404 |

(Continued)

FOREIGN PATENT DOCUMENTS

| JP | 9-61413 | 3/1997 |
| JP | 2002-048782 A | 2/2002 |

(Continued)

OTHER PUBLICATIONS

Japanese Office Action and English translation thereof dated Apr. 28, 2020.

(Continued)

*Primary Examiner* — Christine T Mui
*Assistant Examiner* — Kathryn Elizabeth Limbaugh
(74) *Attorney, Agent, or Firm* — Harness, Dickey & Pierce, P.L.C.

(57) ABSTRACT

A mixed solution in which a compound which forms a nonvolatile membrane at a gas-liquid interface through self-aggregation is dispersed in a volatile liquid, is ejected and atomized in a gas or in a vacuum to produce a droplet particle, and a nonvolatile membrane is then formed at the gas-liquid interface by aligning the compound on a surface of the droplet particle having a reduced diameter due to evaporation of the volatile liquid in the gas or in the vacuum to stabilize the droplet particle. The method produces a novel droplet particle which stably exists in a gas or in a vacuum without collapsing or without evaporation of the volatile liquid inside the droplet particle.

11 Claims, 7 Drawing Sheets

(56) References Cited

U.S. PATENT DOCUMENTS

2013/0187040 A1    7/2013  Abell et al.
2015/0275126 A1*  10/2015  Calcavecchio ...... C10M 171/06
                                                         508/170
2017/0250063 A1    8/2017  Chiu et al.

FOREIGN PATENT DOCUMENTS

| JP | 2004-535916 A | 12/2004 |
| JP | 2013-019816 A | 1/2013 |
| JP | 2016-188811 A | 11/2016 |
| JP | 2017-090306 A | 5/2017 |

OTHER PUBLICATIONS

European Office Action mailed Dec. 4, 2020.
Extended European Search Report dated Jan. 29, 2020.
Japanese Office Action and English translation thereof dated Nov. 19, 2019.
Japanese Office Action dated Jul. 12, 2022 for corresponding Japanese Application No. 2020-111474, and English-language summary thereof.

\* cited by examiner

DROPLET PARTICLE, AND METHOD AND DEVICE FOR PRODUCING DROPLET PARTICLE

TECHNICAL FIELD

The present invention relates to a micro droplet particle which stably exists in the air or in a vacuum, and to a method and a device for producing such a droplet particle.

BACKGROUND ART

The discharge of contaminants into groundwater from contaminated soil has become a large issue, and there is a growing interest in monitoring such contaminants. For component and concentration measurement of groundwater and sample aqueous solutions (collected samples) containing volatile contaminants such as benzene, a field sample is brought into a laboratory or facilities equipped with a large high-sensitive measurement device, and a wide range of contaminants—from heavy metals to organic compounds—including a total of 53 substances made up of 26 substances specified by environmental standards, and 27 substances which need monitoring, are measured for each different component using different analysis methods (see, for example, Patent Literature 1 and Patent Literature 2, and Patent Literature 3 and Patent Literature 4).

CITATION LIST

Patent Literature

Patent Literature 1: Japanese Unexamined Patent Publication JP-A 2017-90306
Patent Literature 2: Japanese Unexamined Patent Publication JP-A 2002-48782
Patent Literature 3: Japanese Unexamined Patent Publication JP-A 2013-19816
Patent Literature 4: Japanese Unexamined Patent Publication JP-A-2016-188811

SUMMARY OF INVENTION

Technical Problem

For identification of the types and quantities (concentrations) of volatile contaminants in groundwater, there have been attempts to use a high-sensitive and high-accuracy mass spectrometer, such as an aerosol time-of-flight mass spectrometer (ATOFMS), and a multi-turn time-of-flight mass spectrometer (MULTUM), which enables an analysis of more than one component at the same time fora single introduced sample.

However, the analysis of substances in groundwater using such a high-sensitive mass spectrometer involves problems in its preparation step. That is, when water (groundwater) which is a solvent of contaminants is finely granulated to a droplet (aerosol) having a diameter or a particle size of 100 µm or less that can be introduced into a mass spectrometer, water or moisture evaporates soon, and therefore the sample droplet disappears before it can be introduced into the device. That is, mass spectrometric measurement or identification of components in such volatile contaminants is not possible in dissolved form in an aqueous solvent such as water. In recent years, even though the mass spectrometer has achieved high sensitivity and high performance, there are many cases where measurement is difficult when a target component is a trace amount component.

Accordingly, an object of the invention is to enable production of droplet particles which can maintain a spherical shape of a microscopic size even under dry conditions or in a vacuum.

Solution to Problem

A droplet particle of the invention includes a volatile liquid, and a compound which forms a nonvolatile membrane at a gas-liquid interface through self-aggregation, stably existing in a gas or in a vacuum without collapsing or without evaporation of the volatile liquid inside the droplet particle.

In addition, in the invention, it is preferably adopted that the volatile liquid is water or an alcohol, or the compound which forms a nonvolatile membrane is a surfactant.

The droplet particle of the invention has a diameter of preferably 10 µm or less, or more preferably 1 µm or less. In the following, the droplet particle (aerosol) having a diameter of 10 µm or less will be occasionally referred to as "aeromicelle", and the droplet particle (aerosol) having a diameter of 1 µm or less will be occasionally referred to as "aeronanomicelle".

A method for producing a droplet particle of the invention includes preparing a mixed solution in which a compound which forms a nonvolatile membrane at a gas-liquid interface through self-aggregation is dispersed in a volatile liquid, and ejecting and atomizing the mixed solution in a gas or in a vacuum to produce a droplet particle; and forming a nonvolatile membrane at the gas-liquid interface by aligning the compound on a surface of the droplet particle having a reduced diameter due to evaporation of the volatile liquid in the gas or in the vacuum to stabilize the droplet particle.

A specific example of the method for producing a droplet particle of the invention includes the steps of:

producing a mixed solution by adding a compound which forms a nonvolatile membrane at a gas-liquid interface through self-aggregation to a volatile liquid;

producing a droplet having a diameter of 100 µm or less by spraying the mixed solution into dry air or a vacuum;

vaporizing the volatile liquid in the droplet to reduce the diameter of the droplet and concentrate components of the mixed solution;

forming a membrane formed of the compound at the gas-liquid interface on a surface of the droplet due to reduction in diameter of the droplet; and transporting a droplet on which the membrane is formed to a predetermined location without making contact with other objects.

A device for producing a droplet particle of the invention includes:

spray means which produces a droplet having a diameter of 100 µm or less from a mixed solution in which a compound which forms a nonvolatile membrane at a gas-liquid interface through self-aggregation is added to a volatile liquid;

a droplet nursing section filled with dry air for suspending the droplet produced; and transport means which transports the droplet produced to a predetermined location.

Advantageous Effects of Invention

The invention provides a novel, long-life droplet particle which, despite containing a volatile liquid as abase, can stably maintain a spherical shape of a microscopic size even under dry conditions or in a vacuum.

A method and a device for producing a droplet particle of the invention enable efficient production of the long-life droplet particle (such as aeromicelle) of a microscopic size.

By the formation of an evaporation protecting membrane, the method and the device for producing a droplet particle of the invention can achieve advantageous effects of reducing vaporization of the dissolved substances and concentrating the substances in the droplet.

BRIEF DESCRIPTION OF DRAWINGS

Other objects, features, and advantages of the invention will be more clearly understood from the following descriptions and the accompanying drawings.

DESCRIPTION OF EMBODIMENTS

An embodiment of the invention is described below in detail, with reference to the accompanying drawings.

Figure 1A:
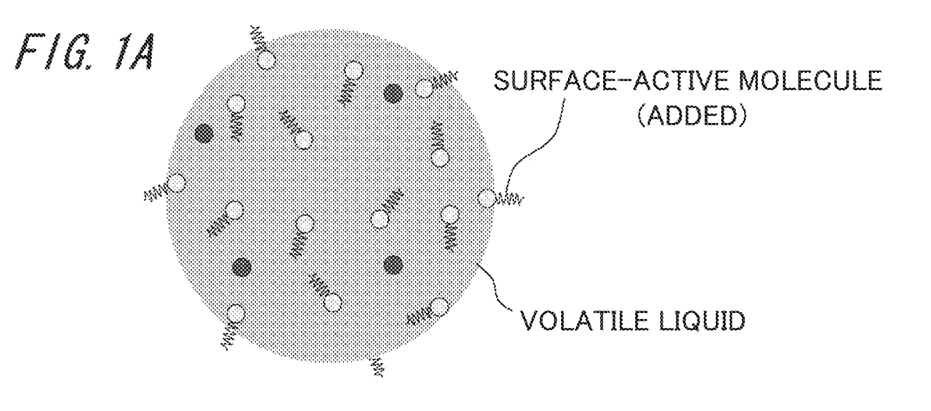
FIGS. 1A, 1B, and 1C are diagrams explaining a sequence of processes which form a droplet particle (aeromicelle) of the invention in this order.
Figure 1B:
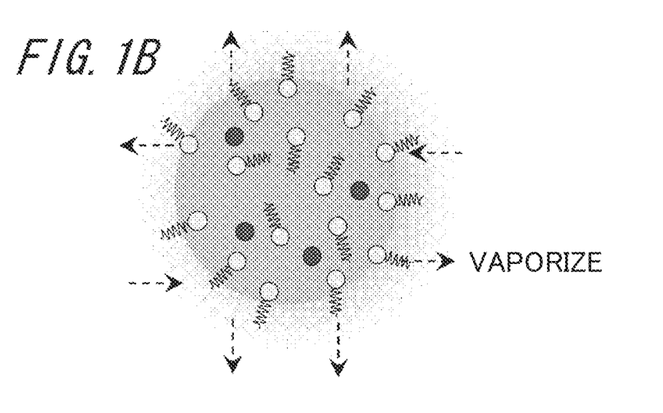
Figure 1C:
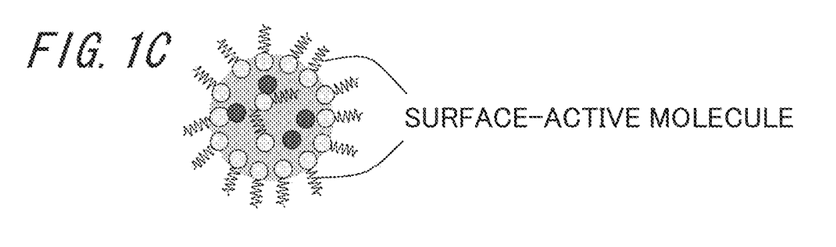

FIG. 1 is a diagram representing the process of forming a droplet particle of the present embodiment.

A droplet particle of the present embodiment is a droplet particle which includes a volatile liquid, for example, such as water and an alcohol, and a compound, such as a surfactant, which forms a nonvolatile membrane at the gas-liquid interface through self-aggregation, as illustrated in FIG. 1C. The droplet particle stably exists in a gas or in a vacuum without collapsing, or without evaporation of the volatile liquid inside the droplet particle.

A traditional droplet particle (aerosol) containing a volatile liquid as a base and having a diameter or a particle size of 100 μm or less involves immediate evaporation of the volatile liquid (e.g., water, an alcohol) in a gas or in a vacuum, and the droplet immediately disappears.

In the novel droplet particle of the invention, however, the compound, such as a surfactant, which forms a nonvolatile membrane at the gas-liquid interface through self-aggregation is added in an appropriate amount, and accordingly, the droplet particle stably remains for at least 1 second even in a gas or in a vacuum without collapsing, or without evaporation of the volatile liquid inside the droplet particle. This is a characteristic feature of the droplet particle of the invention.

As used herein, the term "volatile" means that evaporation naturally takes place in a gas which has not reached a saturated vapor pressure under ordinary atmospheric pressure and room temperature conditions (15° C. in this example). The term "nonvolatile", on the other hand, means that notable volume or mass reduction does not occur during handling as a result of evaporation or sublimation under ordinary atmospheric pressure and room temperature conditions. That is, water, an alcohol, and a mixture of water and an alcohol are all volatile in the invention.

As used herein, the droplet particle being "stable" means that a surface membrane (usually, spherical in shape) formed at the gas-liquid interface remains for a long time period of at least 1 second in dry air or in a vacuum, in which drying or evaporation usually occurs. As used herein, "appropriate amount" means a concentration less than a corresponding critical micelle concentration (cmc) of a surfactant when the compound is a surfactant.

In a method for producing the droplet particle, a mixed solution of the volatile liquid dispersing the compound, such as a surfactant, which forms a nonvolatile membrane at the gas-liquid interface through self-aggregation is first prepared. The mixed solution is then atomized by being ejected into a gas or a vacuum using a spray or an atomizer, and the droplet particle shown in FIG. 1A is produced.

The droplet particle is then reduced in size through vaporization of the volatile liquid in the gas or vacuum, as shown in FIG. 1B, so as to align the compound on the surface of the reduced droplet particle, and form a nonvolatile membrane (a membrane that becomes an evaporation protecting membrane) at the boundary between the droplet particle and the surrounding atmosphere (gas-liquid interface) (see FIG. 1C).

In this way, the method enables stable and efficient production of droplet particles (aeromicelle) which are stable in a gas or in a vacuum. Despite being a micro droplet with a diameter or a particle size of 100 μm or less, the droplet particles can persist in a gas or in a vacuum for a long time, providing enough time for introduction into a mass spectrometer or other device.

As mentioned above, in the present embodiment, water or an alcohol is preferably adopted as "the volatile liquid". In addition, various surfactants are preferably used as "the compound which forms a nonvolatile membrane".

With the foregoing configuration, droplet particles, such as aeromicelles, which are stable in a gas or in a vacuum can be stably and efficiently produced.

The following specifically describes a method and a device for producing the droplet particle.

Figure 2:
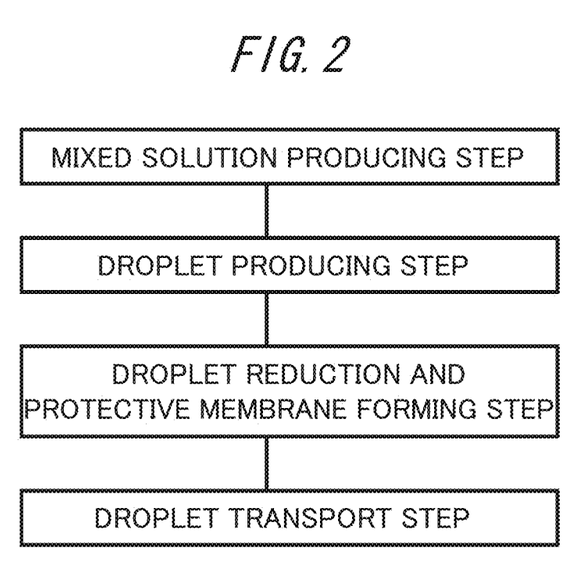
FIG. 2 is a step diagram explaining a droplet particle producing method of an embodiment of the invention.
Figure 3:
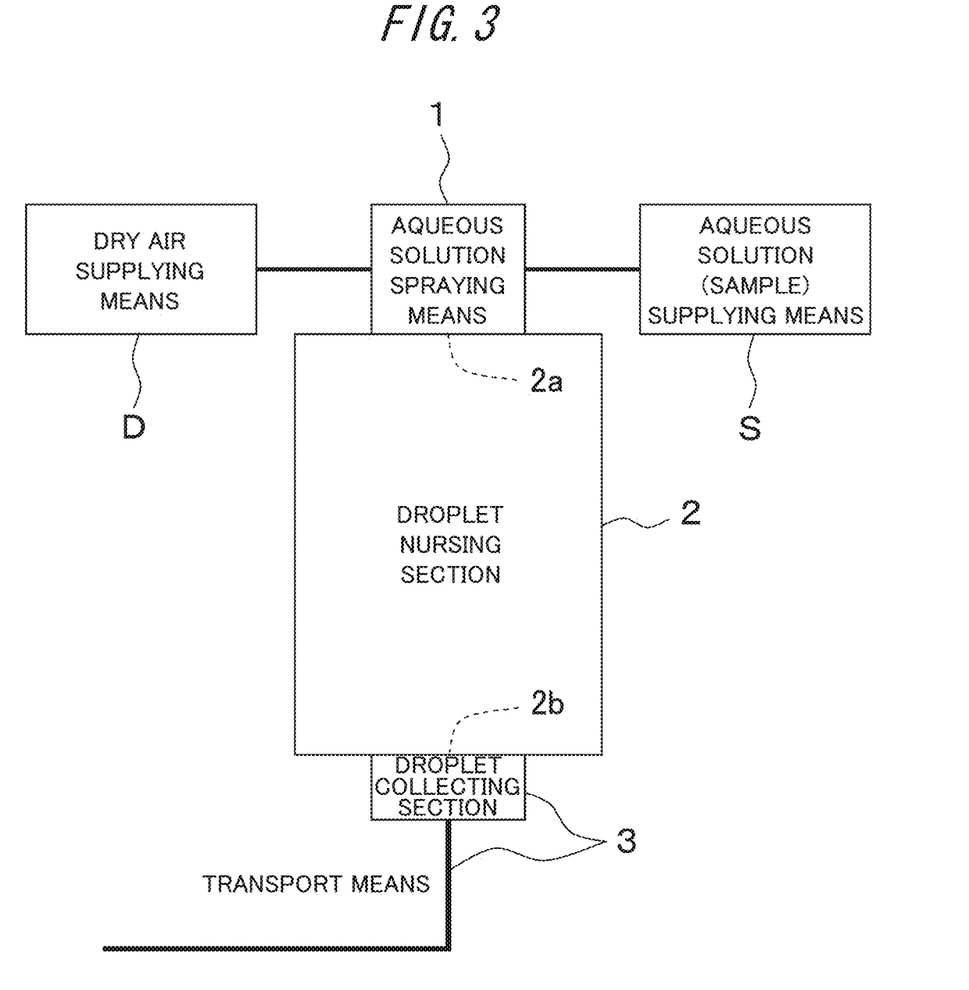
FIG. 3 is a block diagram representing a configuration of a droplet particle producing device of the embodiment.

FIG. 2 is a step diagram representing a droplet particle producing method of a first embodiment of the invention. FIG. 3 is a block diagram schematically representing a configuration of a droplet particle producing device of the first embodiment.

As shown in FIG. 2, the droplet particle producing method of the present embodiment includes at least the steps of producing a mixed solution by adding a compound which forms a nonvolatile membrane at the gas-liquid interface through self-aggregation to a volatile liquid (hereinafter, "mixed solution producing step"); producing a micro droplet having a diameter of 100 μm or less by spraying the mixed solution into dry air or a vacuum (hereinafter, "droplet producing step"); vaporizing the liquid in the droplet to reduce the diameter of the droplet (hereinafter, "droplet reducing step"); forming a membrane (protective membrane) formed of the compound at the gas-liquid interface on a surface of the droplet due to reduction in diameter of the droplet (hereinafter, "protective membrane forming step"); and transporting the droplet on which the membrane is formed to a predetermined location without making contact with other objects (hereinafter, "droplet transport step").

For convenience of explanation, the following descriptions of the first embodiment are based on an example in which water or an aqueous solution is used as the volatile liquid, and a surfactant is used as the compound which forms a nonvolatile membrane. Particles (droplet) having a diameter of 100 μm or less will be occasionally referred to as micro or fine particles. Instead of dry air, it is also possible to use, for example, oxygen, nitrogen, a noble gas, or a mixed gas of these.

To describe each step more specifically, the mixed solution producing step is a preparatory step of adding a surfactant of a concentration less than the critical micelle concentration to a sample aqueous solution in preparation for the subsequent production of droplet. The type of surfactant (detergent) is not particularly limited, as long as it has a property to form a micelle, and the surfactant may be an ionic surfactant or a non-ionic surfactant. The ionic surfactant may be an anionic surfactant, a cationic surfactant, or an ampholytic surfactant. Though the surfactant is used in a small amount, it is preferable that the surfactant be an environmentally friendly surfactant that is safe to human health, taking into consideration its effects on human body and environment.

As used herein, a concentration less than a critical micelle concentration (cmc) refers to a concentration low enough to allow the surfactant to exist without being adsorbed to a liquid surface (interface) or aggregating in water and forming a micelle (sphere) after being added.

The droplet producing step is a step of spraying the aqueous solution (sample) with the added surfactant into dry air or a vacuum to produce a suspension of micro droplets of a diameter of 100 μm or less in the dry air or vacuum. The means of spraying the aqueous solution may be, for example, ultrasonic spraying such as that using a nebulizer, or heat evaporative spraying. As an example, the present embodiment preferably makes use of an atomizer capable of producing large numbers of fine micro droplets with the use of a negative pressure created by a stream of air. Such an atomizer (device) capable of efficiently producing micro droplets will be described later.

After the droplet reducing step and the protective membrane forming step described below, the aerosol formed of an inverse micelle-like micro droplet (the aeromicelle described above) in which a surfactant-made protective thin membrane that prevents evaporation of the liquid is formed, is formed at the gas-liquid interface which is a surface of the liquid (droplet). Typically, the droplet reducing step and the protective membrane forming step are performed at the same time in parallel. However, the order, the timing, and the time of these steps are not limited.

The droplet reducing step is a step of evaporating water or moisture in the micro droplets produced in the droplet producing step from the suspension in dry air or in a vacuum in a droplet nursing section 2 of the producing device (see FIG. 3) to further reduce the diameter of the micro droplets and concentrate the components of the aqueous solution. Here, an aerosol having an extremely small particle size of less than 1 μm is occasionally called "aeronanomicelle".

The protective membrane forming step is a step of forming an evaporation protecting membrane or an anti-drying membrane, which is a thin membrane formed by aligning of molecules of the added surfactant, on the surface of the micro droplet as the droplet reduces its diameter. Here, when the concentration of the surfactant previously added to the solution is higher than the critical micelle concentration due to concentration of respective components of the aqueous solution, a single or multiple molecules of the surfactant in a manner that forms an inverse micelle-like structure are aligned on the surface of the micro droplet, and consequently, the above-mentioned thin membrane is formed.

Here, for example, the volume of the droplet becomes 1/1000 of its initial volume when the particle size decreases from 10 μm to 1 μm, and accordingly, the substances (a target sample and the surfactant) dissolved in the droplet are concentrated 1000 times. In this way, the droplet reducing step and the protective membrane forming step are also equivalent to a concentration step of the target substance in the aqueous solution.

With the foregoing configuration, long-life droplet particles, suspended in air or in a vacuum, can be stably produced in the droplet nursing section 2 (see FIG. 3).

In the transport step, the droplet particles produced are transported to a predetermined location including a place of interest a predetermined place or the like. That is, the droplet transport step is a step of transporting the micro droplet provided with the protective membrane to a predetermined location by means of, for example, a stream of gas (air), or by charging or ionizing the particles, without making contact with other objects. In this way, the droplet particles can be delivered, within its lifetime, to a place where the droplet particles are used or processed.

As used herein, "long life-time" or "long-life" refers to the time during which the droplet particle can reach the predetermined location (a place of interest) from its production, and typically means that the droplet particle remains for a time period of at least 1 second to several seconds, namely, the time period sufficiently longer than about 0.01 second to 0.5 second required for the evaporation of the moisture of the micro droplet particle, without collapsing or evaporating.

As shown in the block diagram of FIG. 3, the droplet particle producing device for producing the droplet particles (aeromicelles) at least includes spray means (aqueous solution spraying means 1) which produces a droplet having a diameter of 100 μm or less from an aqueous solution; a droplet nursing section 2 for suspending the droplet produced; and transport means 3 which transports the droplet particles produced to a predetermined location. In addition to these means and sections, the droplet particle producing device of the present embodiment (FIG. 3) includes dry air supplying means (device D) for supplying dry air to the aqueous solution spraying means 1; and aqueous solution supplying means (device S) for supplying an aqueous solution (sample) to the aqueous solution spraying means 1.

As mentioned above, as the aqueous solution spraying means 1, a spray device, such as an atomizer, capable of efficiently producing micro droplets having a diameter of 100 μm or less, is preferably used. A specific example of the aqueous solution spraying means 1 will be described in detail in the Examples below.

As the droplet nursing section 2, for example, an airtight tank, tank-like container capable of sealing dry air, or the like is used. At the top of the tank or container is provided an opening (hole 2a) through which the droplets sprayed by the aqueous solution spraying means 1 are introduced into the tank or container. A similar opening (hole 2b) is provided at the bottom of the tank or container as a droplet collecting section for discharging the droplet particles.

Inside the droplet nursing section 2, the dry air supplied from the dry air supplying device D described later slowly travels down from the top to the bottom (from the hole 2a at the top to the hole 2b at the bottom in the figure). That is, the droplet particles (aeromicelles) produced are transported with a stream of dry air to the droplet collecting section at the bottom of the container, without making contact with other objects and with remaining suspended in air.

The droplet nursing section 2 may be adapted so that a vacuum, or a low-pressure environment close to a vacuum is created by drawing air or evacuating the droplet nursing section 2 through the hole 2b at the bottom.

The transport means 3 is configured from the droplet collecting section, and a tube-like or a tubular member connected to the droplet collecting section. The transport means 3 is formed of an antistatic material, or is earthed (grounded) so as to prevent adsorption of the droplet particles by static electricity or the like.

In the present embodiment, the droplet particles (aeromicelles) produced are transported from the droplet nursing section 2 to, for example, a particle counter or amass spectrometer under the pressure of dry air. However, in the case of a device devoid of such a pressure source or a positive pressure source, it is possible to additionally provide a negative pressure source or the like for drawing the droplet particles from the droplet nursing section 2 to a predetermined location such as a mass spectrometer.

As the dry air supplying device D which supplies dry air to the aqueous solution spraying means 1, a device is used which at least includes a dry-air unit capable of continuously generating dry air having a relative humidity of 50% or less, and a metering pump unit such as a compressor. The dry air supplied from the dry air supplying device D is used as a power source or a driving source of the droplet particle producing device for micro spraying of the aqueous solution, transport of droplets, etc.

As the aqueous solution supplying device S which supplies an aqueous solution (sample) to the aqueous solution spraying means 1, any configuration may be adopted as long as it is a device capable of supplying an aqueous solution to the spraying means 1 in measured small amounts. For example, the aqueous solution supplying device S may be a combination of a microsyringe, a microsyringe pump and so on. Further, an ultrasonic spray, a heating spray or the like may be used.

With the foregoing configuration, the droplet particle producing device of the present embodiment can spray droplets having a diameter of 100 μm or less and effectively and efficiently produce micro droplet particles (aeromicelles) from them.

EXAMPLES

The following describes Example of actual production of droplet particles.

Figure 4:
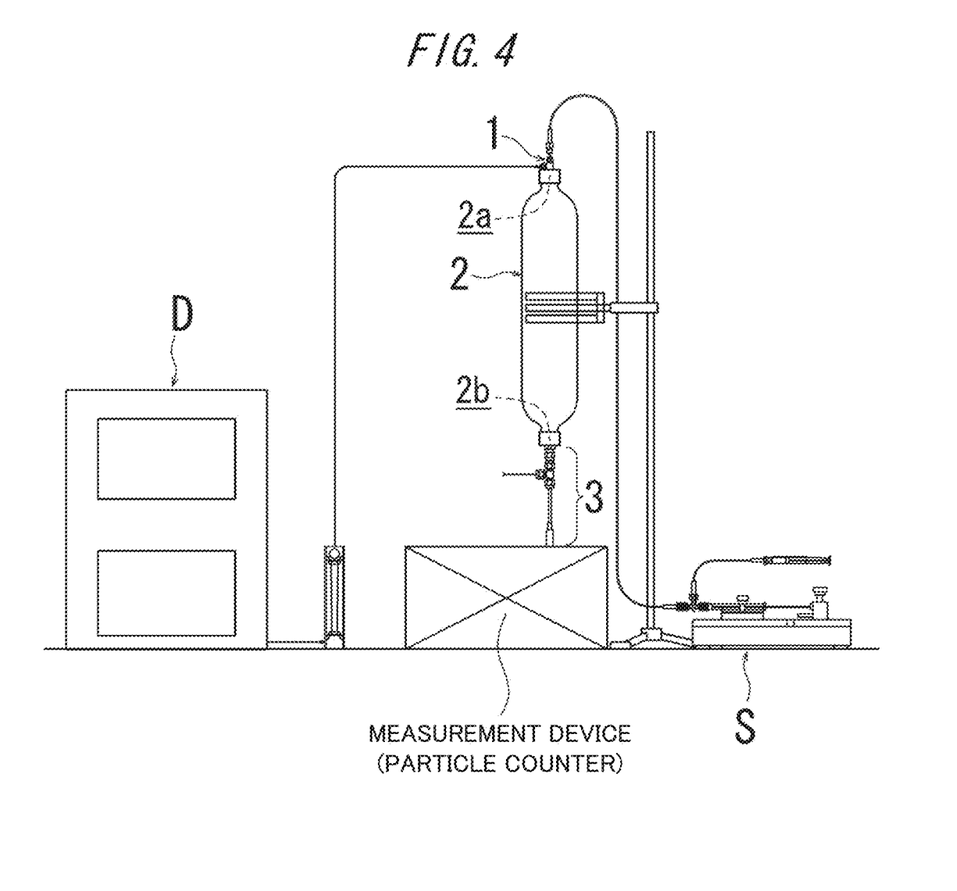
FIG. 4 is a diagram representing a schematic structure of a droplet particle producing device used in Example of the invention.

In Example, the producing device shown in FIG. 4 was used to produce droplet particles. The droplet particle producing device used in Example have the same basic configuration as the device described in the embodiment, and includes the aqueous solution spraying means 1, the droplet nursing section 2, the transport means 3, the dry air supplying device D, and the aqueous solution supplying device S.

Figure 5A:
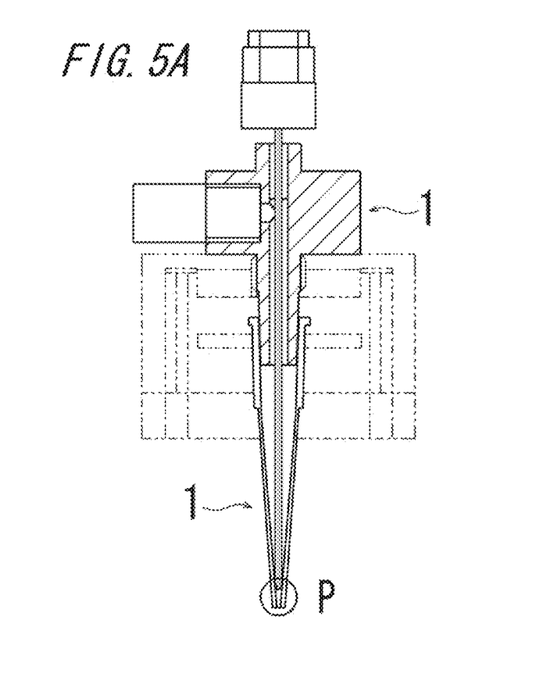
FIG. 5A is a cross sectional view of an end portion of spraying means in the droplet particle producing device of Example.
Figure 5B:
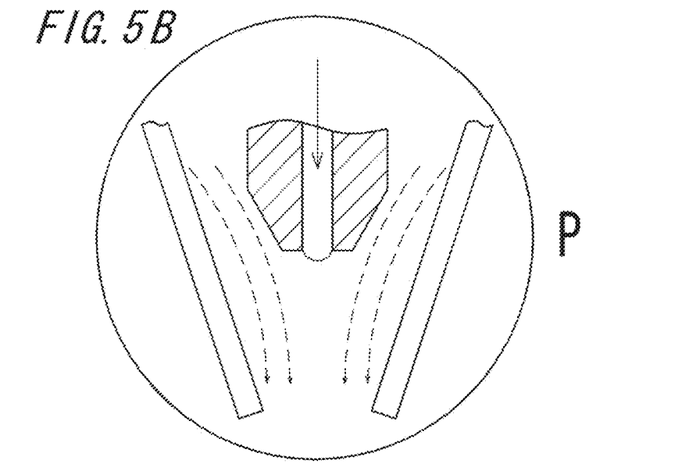
FIG. 5B is an enlarged view of portion P.

FIGS. 5A and 5B are schematic cross sectional views showing a configuration at an end (spinneret) of an aqueous solution spraying means representing the aqueous solution spraying means 1 (atomizer) used in Example. The end of the aqueous solution spraying means has a double tube structure in which an outer tube as a passageway of dry air is disposed on the outer side (outer diameter side) of an inner tube through which an aqueous solution flows. Accordingly, as shown in FIG. 5B, the aqueous solution (sample) ejected out of the inner tube is jetted into the droplet nursing section 2 in the form of micro droplets of about 5 to 20 μm formed under the negative pressure created by the high-speed outflow of dry air from the end portion of the outer tube.

The droplet nursing section 2 of Example is a vertically narrow tank with a vertical length (height) of about 360 mm, a maximum diameter of about 42 mm in the middle, and a volume of about 2 L. Dry air was supplied to the droplet nursing section 2 through the end of the aqueous solution spraying means 1 at a rate of about 1.5 L per hour, and was released from the bottom of the droplet nursing section 2.

Example 1

The droplet particle producing device of the foregoing configuration (FIG. 4, FIG. 5A) was used to produce droplet particles. Purified water was used as the aqueous solution (water), and 10 to 100 μM (M=mol/L) of a linear sodium alkyl(dodecyl)benzenesulfonate (hereinafter, simply "LAS"), which was a typical anionic surfactant, was added thereto. The solution was then checked for the presence of droplet particles (aeronanomicelles) of a microscopic size. The critical micelle concentration (cmc) of LAS was 1.2 mmol/L (1200 μM).

[Aqueous Solution Spraying Conditions of Atomizer]

As shown in FIG. 5 B, the LAS-containing purified water was sprayed toward the droplet nursing section 2 (the lower side of the figure) through the inner tube at a flow rate 2.0 μL/min while supplying dry air through the space between the inner tube and the outer tube of the aqueous solution spraying means 1 at a rate equivalent of 1.5 L/min. With a measurement device (light scattering particle counter KC-01E available from Rion Co., Ltd.) directly attached to the solution collecting section disposed at the bottom of the droplet nursing section 2, a number and a particle size distribution of droplet particles (aeromicelles) which reach the bottom of the droplet nursing section 2 was measured for one minute per experiment. It is to be noted here that only a few droplet particles will be observed in a test conducted with purified water containing no LAS.

Figure 6:
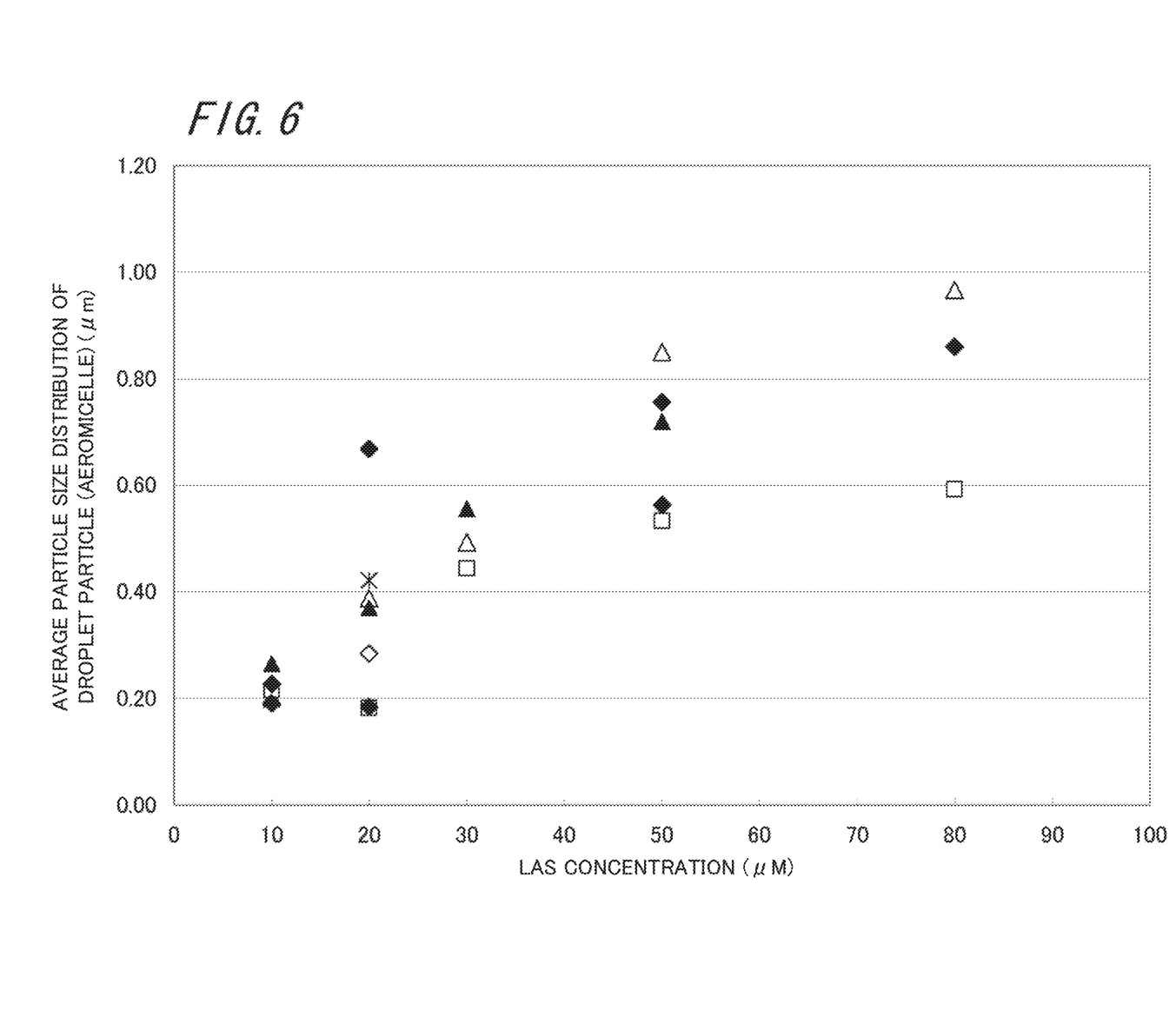
FIG. 6 is a scatter graph plotting particle sizes at different surfactant concentrations for droplet particles obtained in Example.

FIG. 6 represents the results of the measurements of the average particle size of the droplet particles (aeromicelles) detected at LAS concentrations of 10, 20, 30, 50, and 80 μM. The scatter graph plots all average particle size distributions of droplets from multiple measurements.

Figure 7:
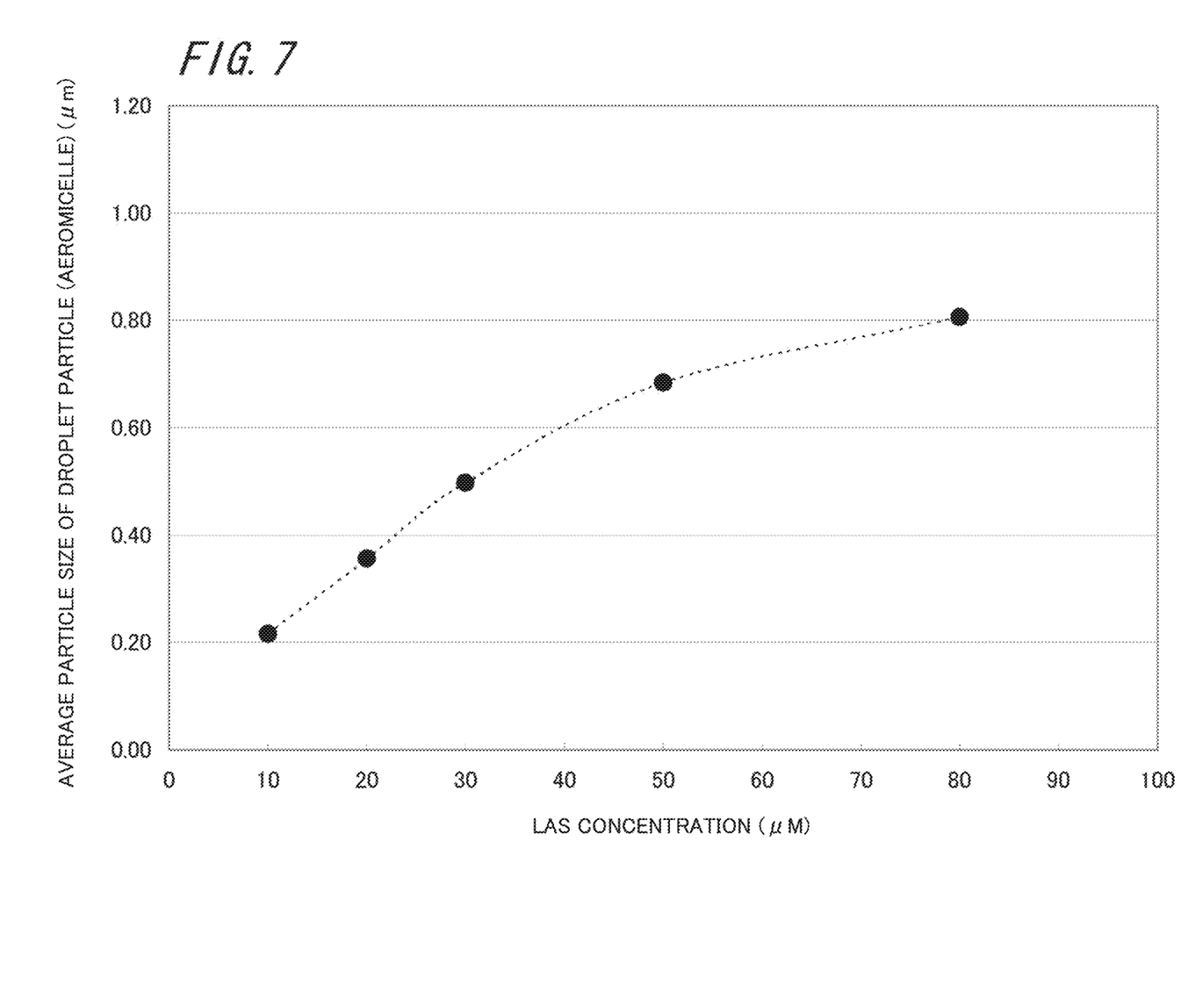
FIG. 7 is a graph plotting average particle sizes at different concentrations for droplet particles obtained in Example.

Next, the graph shown in FIG. 7 represents changes in the average particle size taken from the measured results of FIG. 6 at each concentration. In other words, FIG. 7 represents expected values of size of droplet particle (aeromicelle) which will be obtained for different LAS concentrations. The results are in good agreement with the results of model calculations (simulations) for a monomolecular membrane in which single molecules of LAS are uniformly aligned at the interface on the surface of a droplet particle assumed to be a sphere.

About 2800 droplets having a particle size of 0.3 to 0.5 μm, and about 120 droplets having a particle size of 0.5 to 1.0 μm were produced with 10 μM of LAS (per 2.0 μL for one minute), and about 12000 droplets having a particle size of 0.3 to 0.5 μm, and about 1100 droplets having a particle size of 0.5 to 1.0 μm were produced with 50 μM of LAS (per 2.0 μL for one minute). It is confirmed that these were detected almost continuously throughout the 1-minute measurement period. It was possible to detect the droplet particles (aeromicelles) continuously for at most 80 seconds.

It has been found that the method using the producing device of the invention could stably and efficiently produce droplet particles (aeromicelles or aeronanomicelles) of a microscopic size from water containing LAS.

It is confirmed that similar results to the above Example were obtained even when sodium dodecyl sulfate (SDS; a critical micelle concentration (cmc) of 8.2 mM) was used as the surfactant added.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

The long-life micro droplet particle of the invention is preferred for applications, for example, in directly introducing a liquid sample into a mass spectrometer and other device, and in concentrating a liquid sample on-line in such processes. The invention thus enables continuous monitoring of chemical substances dissolved in a liquid sample. The droplet particle also has other advantages, including extension of life of droplet particles used for paint sprays, and drug delivery using droplet particles as capsules. For drug delivery in particular, the invention enables efficient treatment by changing the size of droplet particles to control the reachable part of human body (nose, throat, trachea, lungs, pulmonary alveolus, etc).

REFERENCE SIGNS LIST

1: Aqueous solution spraying means
2: Droplet nursing section
3: Transport means
D: Dry air supplying device
S: Aqueous solution supplying device

The invention claimed is:
1. A droplet particle, comprising:
a liquid which evaporates under a condition of gas or vacuum;
a target component substance; and
a surfactant aligning molecules thereof as an inverse micelle-like structure through self-aggregation to form a nonvolatile membrane at a gas-liquid interface,
stably existing under the condition for at least 1 second to 80 seconds without collapsing or without evaporation of the liquid inside the droplet particle, under the condition, the droplet particle being a droplet particle that is suspended and transported in a gas or in a vacuum, to a desired part to be reached without contacting other objects,
the droplet particle being formed by preparing a mixed solution including the liquid, the target component substance, and the surfactant having a lower concentration than a critical micelle concentration, producing a droplet having a diameter of less than 100 μm by atomizing the mixed solution under the condition, and reducing a diameter of the droplet by evaporating the liquid during a suspending transportation of the droplet and thereby concentrating the target component substance, whereby a concentration of the surfactant in the droplet particle exceeds the critical micelle concentration, and the droplet particle has a spherical shape and the droplet particle has a diameter of 10 μm or less depending on the concentration of the surfactant in the mixed solution.

2. The droplet particle according to claim 1, wherein the liquid comprises water or an alcohol.

3. The droplet particle according to claim 1, wherein the droplet particle has a diameter of 1 μm or less.

4. A method for producing a droplet particle, comprising:
producing a droplet having a diameter of less than 100 μm by atomizing a mixed solution, the mixed solution including,
a liquid which evaporates under a condition of gas or vacuum,
a target component substance, and
a surfactant having a lower concentration than a critical micelle concentration, under the condition; and
reducing a diameter of the droplet by evaporating the liquid during a suspending transportation of the droplet and thereby concentrating the target component substance, and forming a membrane which suppresses evaporation of the liquid, by aligning molecules of the surfactant as an inverse micelle-like structure through self-aggregation on an entire surface of a droplet with a reduced diameter to produce a droplet particle, whereby a concentration of the surfactant in the droplet particle exceeds the critical micelle concentration, and the droplet particle has a spherical shape and the droplet particle has a diameter of 10 μm or less depending on the concentration of the surfactant in the mixed solution,
under the condition, the droplet particle being able to be stably suspended for at least 1 second to 80 seconds and transported to a desired part to be reached without contacting other objects, the droplet particle being a droplet particle that is suspended and transported in a gas or in a vacuum.

5. The method for producing the droplet particle according to claim 4, wherein the concentration of the surfactant in the mixed solution is selected to achieve the diameter of the droplet particle corresponding to the desired part to be reached.

6. The method for producing the droplet particle according to claim 4, wherein the liquid comprises water or an alcohol.

7. The method for producing the droplet particle according to claim 4, wherein the condition is atmospheric pressure of dry gas at room temperature.

8. The method for producing the droplet particle according to claim 4, wherein the desired part to be reached is a particle counter or a mass spectrometer.

9. The method for producing the droplet particle according to claim 4, wherein the droplet particle is transported by an earthing tube so as to reduce adsorption of the droplet particles by static electricity.

10. A method for reaching a droplet particle to a desired part to be reached, comprising:
producing a droplet having a diameter of 100 μm or less by atomizing a mixed solution, the mixed solution including,
a liquid which evaporates under a condition of gas or vacuum,
a target component substance, and
a surfactant having a lower concentration than a critical micelle concentration, under the condition; and
reducing the diameter of the droplet by evaporating the liquid during a suspending transportation of the droplet and thereby concentrating the target component substance, and forming a membrane which suppresses evaporation of the liquid, by aligning molecules of the surfactant as an inverse micelle-like structure through self-aggregation on an entire surface of a droplet with a reduced diameter to produce a droplet particle, whereby a concentration of the surfactant in the droplet particle exceeds the critical micelle concentration, the droplet particle has a spherical shape and the droplet particle has a diameter of 10 μm or less depending on the concentration of the surfactant in the mixed solution, the concentration of the surfactant of the mixed solution being selected to achieve the diameter of the droplet particle corresponding to a desired part to be reached by utilizing a phenomenon in which the diameter of the droplet particle increases as the concentration of the surfactant of the mixed solution increases, so as to, under the condition, stably suspend for at least 1 second to 80 seconds and transport the droplet particle to the desired part to be reached without contacting other objects, the droplet particle being a droplet particle that is suspended and transported in a gas or in a vacuum.

11. A device for producing a droplet particle, comprising:

a microsyringe or microsyringe pump configured to supply a mixed solution including a liquid which evaporates under a condition of gas or vacuum, a target component substance, and a surfactant having a lower concentration than a critical micelle concentration;

an atomizer configured to produce a droplet having a diameter of 100 μm or less of the mixed solution supplied from the microsyringe or microsyringe pump;

a droplet nursing section filled with dry air, the droplet nursing section configured to suspend the droplet from the microsyringe or microsyringe pump and reduce a diameter of the droplet by evaporating the liquid during a suspending transportation of the droplet and thereby concentrating the target component substance, and forming a membrane which suppresses evaporation of the liquid, by aligning molecules of the surfactant as an inverse micelle-like structure through self-aggregation on an entire surface of the droplet with a reduced diameter to produce the droplet particle, whereby a concentration of the surfactant in the droplet particle exceeds the critical micelle concentration, and the droplet particle has a spherical shape and the droplet particle has a diameter of 10 μm or less depending on the concentration of the surfactant in the mixed solution; and a tube configured to transport the droplet from the droplet nursing section to a desired location while stably suspending the droplet for at least 1 second to 80 seconds, the droplet particle being a droplet particle that is suspended and transported in a gas or in a vacuum.

* * * * *